United States Patent [19]

Jones et al.

[11] Patent Number: 4,997,095
[45] Date of Patent: Mar. 5, 1991

[54] METHODS OF AND SYSTEM FOR SWING DAMPING MOVEMENT OF SUSPENDED OBJECTS

[75] Inventors: James F. Jones; Ben J. Petterson; David R. Strip, all of Albuquerque, N. Mex.

[73] Assignee: The United States of America as represented by the United States Department of Energy, Washington, D.C.

[21] Appl. No.: 341,087

[22] Filed: Apr. 20, 1989

[51] Int. Cl.$^5$ .............................................. B66C 13/06
[52] U.S. Cl. ................................... 212/147; 212/159; 212/161
[58] Field of Search ................ 212/146, 147, 159, 161

[56] References Cited

U.S. PATENT DOCUMENTS

| | | | |
|---|---|---|---|
| 3,384,245 | 5/1968 | Bonnaure | 212/1 |
| 3,517,830 | 6/1970 | Virkkala | 212/132 |
| 3,921,818 | 11/1975 | Yamagishi | 212/132 |
| 4,512,711 | 4/1985 | Ling et al. | 414/786 |
| 4,603,783 | 8/1986 | Tax et al. | 212/132 |
| 4,717,029 | 1/1988 | Yasunobu et al. | 212/132 |
| 4,756,432 | 7/1988 | Kawashima et al. | 212/132 |

FOREIGN PATENT DOCUMENTS

| | | | |
|---|---|---|---|
| 3233444 | 3/1983 | Fed. Rep. of Germany | 212/147 |
| 3714570 | 11/1987 | Fed. Rep. of Germany | 212/147 |

OTHER PUBLICATIONS

G. P. Starr, "Swing-Free Transport of Suspended Objects with a Path-Controlled Robot Manipulator", *Journal of Dynamic Systems, Measurement, and Control*, vol. 107, Mar. 1985, pp. 97-100.

A. Sturm, "Robotic Trajectory Control of Acceleration and Velocity Using Cubic Splines", *8th Applied Mechanisms Conference*, St. Louis, Mo., Sep. 19-31, 1983.

*Primary Examiner*—Sherman Basinger
*Assistant Examiner*—Thomas J. Brahan
*Attorney, Agent, or Firm*—Anne D. Daniel; James H. Chafin; William R. Moser

[57] ABSTRACT

A payload suspended from a gantry is swing damped in accordance with a control algorithm based on the periodic motion of the suspended mass or by servoing on the forces induced by the suspended mass.

14 Claims, 4 Drawing Sheets

METHODS OF AND SYSTEM FOR SWING DAMPING MOVEMENT OF SUSPENDED OBJECTS

The United States Government has rights in this invention pursuant to Contract DE-AC04-76DP00789 between the United States Department of Energy and AT&T Technologies, Inc.

BACKGROUND OF THE INVENTION

The instant invention relates to methods of and systems for oscillation damping of trajectories and stops for simply suspended payloads by utilizing controlled acceleration.

In material handling applications, the use of intelligent computer-controlled machinery, such as computer-controlled bridge cranes, is now under very serious consideration. A particular application for this technology is the handling of material at nuclear waste storage and dump sites where 20-foot-long casks containing nuclear waste materials weighing up to 100 tons must be moved to various locations throughout the sites. It is imprudent to have personnel standing in a nuclear waste dump to assist in positioning payloads being loaded into the dump not only because of radiation hazards but also because of the size and weight of the casks. Accordingly, it is necessary to lower these articles with precision while being controlled from above. When payloads are relatively heavy and are transported by bridge cranes into position, the payloads conventionally continue to swing back and forth after the trolley of the crane has stopped moving. This happens for even minor adjustments in the position of the payload. Consequently, the task of lowering or positioning a storage cask in a nuclear waste dump or storage site could be quite protracted and aggravating when relying on conventional approaches where the bridge crane operator relies on his skill to damp the motion of a payload.

It has been found that damping oscillations of payloads simply suspended from cranes is possible if the acceleration of the crane or manipulator is programmable. Additionally, residual oscillation remaining after transportation of the payload is complete may be damped by servoing off the forces created by the pendulum motion if the transporting device can be operated under computer control.

While the prior art as exemplified by the patent literature has considered these problems, there are drawbacks in the prior art of which the inventors are aware. U.S. Pat. No. 4,603,783 is directed to cosine acceleration and discloses a method of taking full advantage of the torque capability of an available motor to accomplish a swing-damped trajectory and swing-free stop. In this patent, the payload under consideration may weigh as much or more than that of the bridge/trolley. Consequently, the crane trolley acceleration is maximum when the payload is directly under the trolley and is reduced as the payload swings out. However, the cube-root formula describing the pendulum period appears incorrect and the small angular formula is used for the period of oscillation. U.S. Pat. No. 4,756,432 is directed to a two-pulse method in which mid-course constant velocity is somehow controlled. However, there appear to be some deficiencies in this disclosure. For example, it is not understood why one would decrease velocity during mid-course transport, and there is no indication that the friction working against the load during acceleration and helping during deceleration is accounted for. There is a discussion of rope length and load swing. However, the period of swing is of great importance, and it is stated that running resistance is a function of "x" when it should be independent of position. Finally, it would appear that constant velocity during acceleration and deceleration would be desirable because it decreases the overall time of a move, rather than allowing a reduction in velocity between pulses when accelerating and an increase in velocity between pulses during deceleration.

U.S. Pat. No. 4,717,029 discloses full period acceleration. However, rope length is used to determine the period instead of the length to the center of gravity of the pendulum. Moreover, in this patent the change in period due to crane acceleration is neglected.

Considering older patents, U.S. Pat. No. 3,517,830 utilizes two pulses or a one-period pulse, but does not account for the period change due to acceleration U.S Pat. No. 3,921,818 directed to two-pulse acceleration measures tension $\theta$ and $\dot{\theta}$ which would allow one to do a considerable amount of tuning or to develop special profiles. However, in this patent, coasting is allowed between acceleration and deceleration pulses. When one considers the effect of friction, the coasting really creates confusion by providing different and possibly unpredictable velocity changes during the acceleration and deceleration phases of a move.

In view of the deficiencies of the prior art in addressing the problems of providing a method of and apparatus for swing-damping movement of suspended objects, there is a need for more practical viable approaches.

SUMMARY OF THE INVENTION

In view of the aforementioned difficulties in swing damping objects suspended from gantries and the like, it is an object of the instant invention to provide a new and improved system for and method of swing damping suspended payloads by controlling accelerations, constant velocity times and decelerations of the load. In accordance with a preferred embodiment of the invention, force servo damping is utilized wherein a gantry manipulator is controlled by a digital 6-axis robot controller utilizing inputs from a force transducer, a control computer and a line tracker so as to provide high-speed communication with the robot controller. The force transducer is a force/torque sensor which transduces the three principal forces and their corresponding moments and which converts force and torque signals to digital readings for transmission to the control computer. The control computer executes the oscillation damping algorithm as it continually monitors the force sensor, computes the required position updates and communicates this information to the line tracker board. The line tracker board provides interrupt driven communication for trajectory updates from the control computer to the robot controller.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 2:
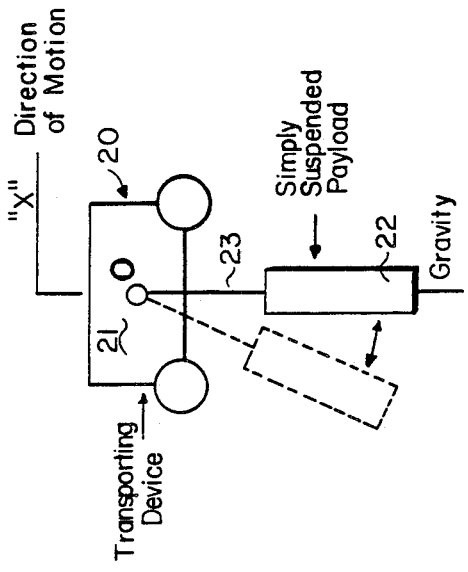
FIG. 2 is a diagrammatical view of the bridge crane under consideration showing a trolley and suspended load.
Figure 1:
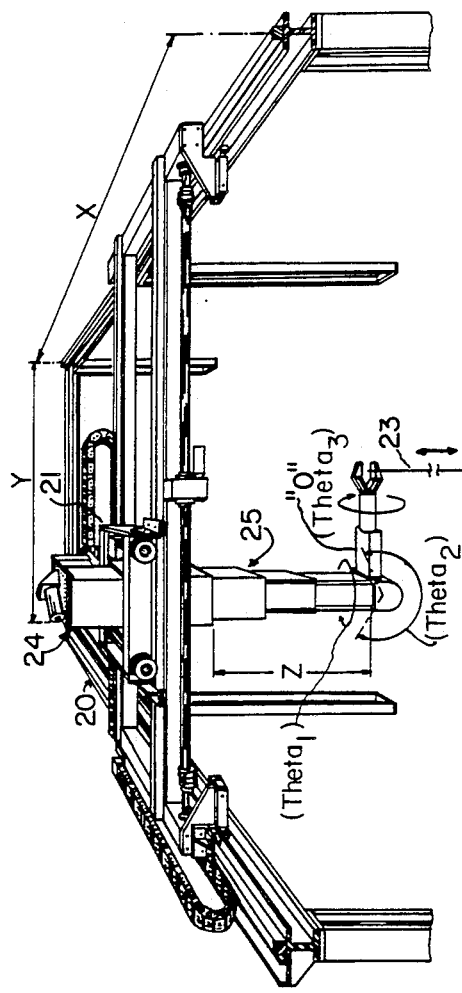
FIG. 1 is a perspective view of a bridge crane utilizing the system of the instant invention to practice the method of the instant invention.

Referring now to FIGS. 1 and 2, there is shown a bridge crane, designated generally by the numeral 20, with which the system of the instant invention is used to practice the method of the instant invention. The bridge crane 20 utilizes a typical trolley 21 which rolls in the horizontal direction "X" while being transportable in the direction "Z" and being capable of lifting a simply suspended object or payload 22 which is free to swing by a cable 23 about a pivot point "O". Since the trolley 21 can move in the X direction, the pivot point O is a movable pivot point. If the moving pivot point O undergoes a particular acceleration profile, the simply suspended payload 22 exhibits an oscillation damped transport and an oscillation damped stop. It is the control of this oscillation which is the object of this invention. If the trolley 21 has to stop and wait for oscillations to die down each time it transports a payload 22, enormous inefficiencies begin to develop in the operation since the crane operator must wait for a substantial period of time for the swinging payload to stop. If the payload weighs 100 tons, the wait can consume orders of magnitude more time than the move. These inefficiencies are exacerbated each time the trolley moves in the X or Z direction to make a minor adjustment.

CONSTANT ACCELERATION TRAJECTORY

Figure 3:
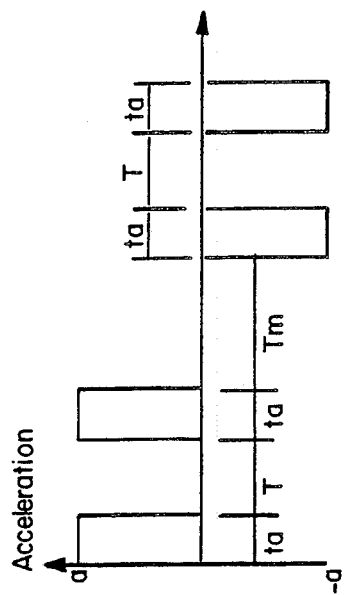
FIG. 3 is an acceleration profile for a moving pivot point in FIG. 1.

Referring now to FIG. 3, there is shown an acceleration profile for the moving point "O" of FIGS. 1 and 2 which results in an oscillation damped trajectory for a simply suspended payload or object 22. Point "O" has a constant acceleration for a time $t_a$. After time $t_a$, point O moves at an intermediate constant velocity for a time T. At the time point $t_a + T$, point O again accelerates with a constant acceleration for a period of time $t_a$. T is selected such that the oscillation imposed on the object due to the second duration of acceleration is 180 degrees out of phase with the initial oscillation of the swinging object 22. The object 22 moves at a constant velocity during a time $T_m$ without oscillation. After an arbitrary length of time $T_m$, applying the same procedure for deceleration results in an oscillation damped stop of the object 22. Thus, in accordance with the principle of the instant invention, the objective is to determine the value of the time T, parameterized with respect to $t_a$, which yields oscillation damped movement.

The motion of the swinging object can be described using the following equations [1,2,3].

$$\ddot{\theta} + \omega_o^2 \sin\theta = 0 \qquad (1)$$

Equation (1) is a second order nonlinear differential equation with constant coefficients. For small angles of oscillation, (1) is typically linearized, therefore greatly simplifying its solution. However, for large angles of oscillation, a linear approximation of (1) will not yield accurate results.

Since large magnitudes of acceleration of the transporting device will cause large angles of oscillation of a simply suspended payload, the linear approximation to (1) will not always be sufficiently accurate. Ideally, (1) should be solved exactly. However, the exact solution to (1) involves a complete elliptic integral of the first kind, and hence is insolvable in terms of elementary transcendental functions. Therefore, some method of accurately approximating (1) for large angles of oscillation becomes necessary.

Figure 4:
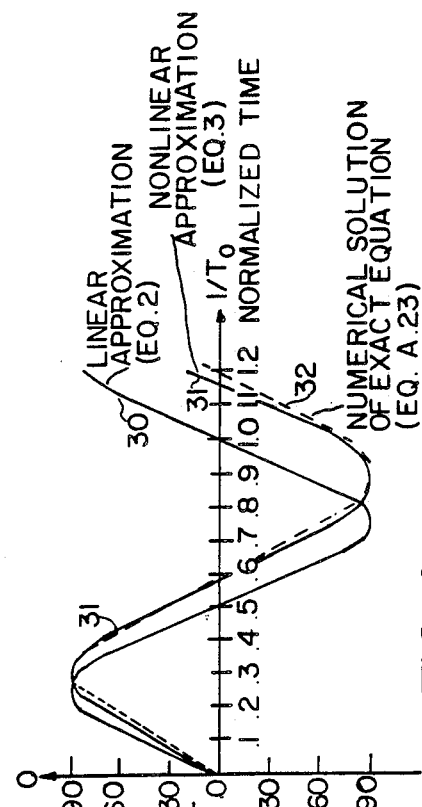
FIG. 4 is a diagram displaying angular displacement plotted as a function of normalized time for a swinging object.

Using a linear approximation and solving (1) for $\theta$ as a function of time yields:

$$\theta = \alpha \sin\left(2\pi \frac{t}{\tau_o}\right) \qquad (2)$$

where
  $\alpha$—amplitude oscillation
  $\tau_o$—period of the object for small amplitudes As is shown in FIG. 4, if equation (2) is used for large amplitudes of oscillation, significant error can result. In FIG. 4, angular displacement is plotted as a function of normalized time for a swinging object. The linear approximation (2) yields a sinusoidal curve 30 which is very similar to the exact numerical solution 31. However, the period of the linear approximation 30 is significantly different from the exact solution, as is readily apparent by the point at which the curves 30 and 31 cross the axis $t/\tau_o$. An approximate solution of equation (1) which yields good results for angles of oscillation can be obtained by collecting all the nonlinearities into one parameter, i.e., the period. Using the nonlinear approximation for the period of the swinging object 22 (FIG. 1) for $\theta$ as a function of time yields:

$$\theta = \alpha \sin\left(\frac{2\pi}{1 + (\alpha^2/16)}\left[\frac{t}{\tau_o}\right]\right) \quad (3)$$

The behavior of the nonlinear approximation (3) as shown by the broken line curve 32 is very close to that of the exact numerical solution as shown by the curve 31 in FIG. 4.

Figure 5:
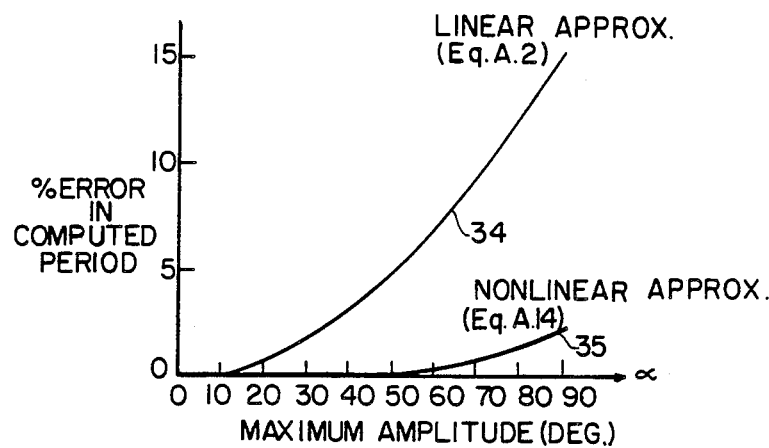
FIG. 5 is a diagram showing the percent error in a calculated period utilizing linear and nonlinear approximations of the period with respect to the exact solutions as a function of maximum swing-out amplitude.

Referring now to FIG. 5, there is shown the percent error in the calculated period using the linear and nonlinear approximations, 34 and 35 respectively, with respect to the exact solution as a function of maximum swing amplitude of the payload 22. The linear solution exceeds one percent error after about 20 degrees of maximum amplitude. However, the nonlinear approximation exceeds one percent error only after 70 degrees of maximum amplitude. Hence, if the system acceleration causes a maximum swing amplitude greater than a few degrees, the nonlinear aspects of the swinging object must be taken into account.

In theory, the analysis of the object's motion could continue to a maximum swing amplitude of 180 degrees before the transition from oscillatory to rotational motion occurs and the analysis becomes invalid. However, as a practical matter, the supporting member or cable 23 always remains in tension. At large swing amplitudes exceeding 90 degrees, the supporting member 23 may go into compression to maintain oscillatory motion. Therefore, the practical upper limit of analysis sets a limit of 90 degrees maximum amplitude for the object's swing.

Referring now again to FIG. 3 where the acceleration profile is shown, and considering the nonlinear approximation for the differential equation of motion (1), a function may be written that expresses the constant velocity time T as a function of acceleration time $t_a$ and a nonlinear approximation for the period of the swinging object $\tau_T$ and $\tau_{ta}$ which are functions of the acceleration magnitude a/g and other measurable parameters. The resulting equation is:

$$T = \frac{\tau_T}{\pi} \tan^{-1}\left[\frac{\tau_T}{\tau_{ta}\tan(\pi t_a/\tau_{ta})}\right] \quad (4)$$

where $\tau_T$—the period of the swinging object, accounting for all nonlinearities during the time of intermediate constant velocity.

$\tau_{ta}$—the period of the swinging object, accounting for all nonlinearities during the time of constant acceleration.

Figure 6:
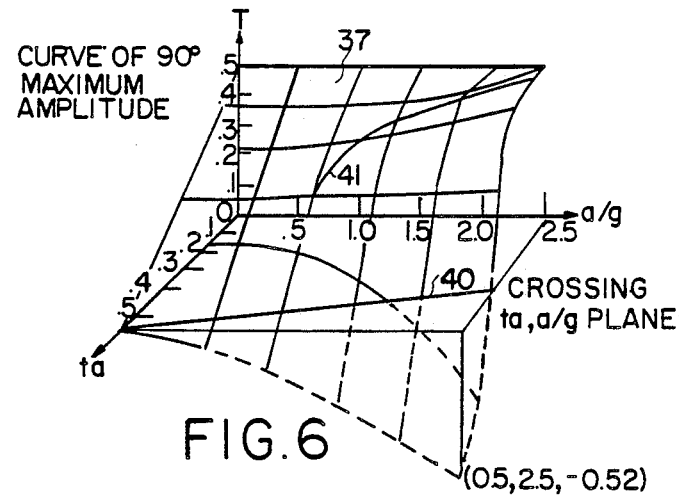
FIG. 6 is a three-dimensional diagram illustrating a surface defined by an equation for intermediate constant velocity time T as a function of normalized acceleration and acceleration time for a swinging object with a unit period.

Referring now to FIG. 6, FIG. 6 illustrates the surface defined by equation (4) for intermediate constant velocity time T as a function of normalized acceleration a/g and acceleration time $t_a$ for a swinging object with a unit small angle period. In the graph of FIG. 6, notice that the limits for acceleration time are zero and one-half. Zero acceleration time corresponds to impulse accelerations resulting in an intermediate constant velocity time of one-half period, as explained in the article by G.P. Starr, "Swing-Free Transport of Suspended Objects with a Path-Controlled Robot Manipulator", *Journal of Dynamic Systems Measurement and Control - Technical Briefs*, Feb. 15, 1985.

An acceleration time of 0.5 corresponds to accelerating for one-half the small angle period of the swinging object followed by, if the magnitude of the acceleration is small, an acceleration for another one-half period without an intermediate duration of constant velocity. As suggested in the article by D.R. Strip, "Swing-Free Transport of Suspended Objects: A General Treatment", SAND87-0714 (Sandia National Laboratories - Albuquerque, N. Mex.), this acceleration profile of an acceleration time is equal to one-half the small angle period.

The surface of FIG. 6 is divided between real (the shaded portion 37) and nonreal or nonpractical (nonshaded section 38) solutions. Bounding the real solutions 37 are two curves 40 and 41 shown on the solution surface. The curve 40 defines the intersection of the surface 37 and the $t_a$, a/g plane and the second curve 41 is a curve defining the boundary of nonpractical solutions. The curve 40, defines the intersection of the surface and the $t_a$, a/g plane, separating real from nonreal solutions. If the solution lies below the $t_a$, a/g plane, the required constant velocity time has a negative value. Since negative time is not a real solution, any part of the surface extending below the $t_a$, a/g plane is ignored.

In the curve shown in FIG. 6, the boundary of 90 degrees maximum amplitude defines the limit of maximum swing amplitude. If the angular displacement and velocity at time $t_a$ are such that the swinging object 22 has a maximum swing amplitude greater than 90 degrees during the intermediate constant velocity, it is not a practical solution. Moreover, the characteristics of the actual system may reduce the practical limit of maximum swing amplitude to less than 90 degrees.

Figure 7:
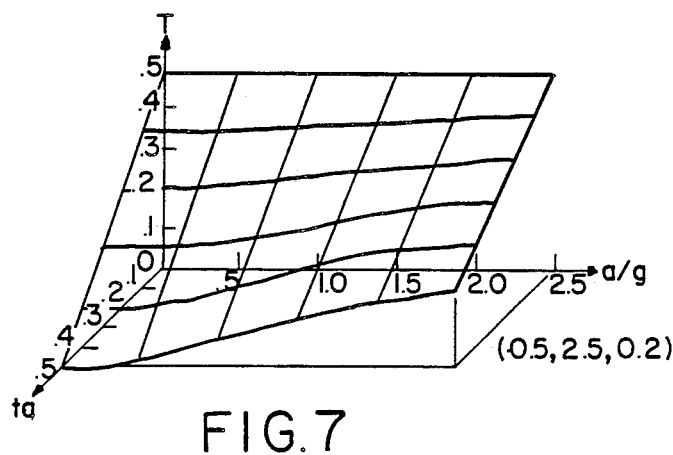
FIG. 7 is a diagram similar to FIG. 6 assuming a linear approximation for motion of the swinging object.

Referring now to FIG. 7, there is shown a surface similar to that of FIG. 6. However, in FIG. 7 a linear approximation for motion of the swinging object 22 is assumed, whereas in FIG. 6 the nonlinear approximation for the motion of the swinging object is utilized. Notice that both approximations approach the same true linear solution as acceleration approaches zero. However, as acceleration increases the two surfaces show a significantly different behavior. The surface for a linear approximation (FIG. 7) tends to bend up indicating that the duration of constant velocity T increases as the system's acceleration magnitude a/g increases. In contrast, the surface for the nonlinear approximation (FIG. 6) tends to curve down toward a reduced constant velocity time as the acceleration magnitude increases.

A comparison of FIGS. 6 and 7 shows that if the desired working region is in an area of increased acceleration, the nonlinear characteristics of the swinging object must be included. In fact, if the working region is in the area of large acceleration and time, it is more accurate to neglect the effects of acceleration and assume a linear approximation (FIG. 7) for the motion of the simply suspended object 22 (FIG. 1) than to include the effects of acceleration and to assume a linear approximation for the motion of the simply suspended object.

Figure 8:
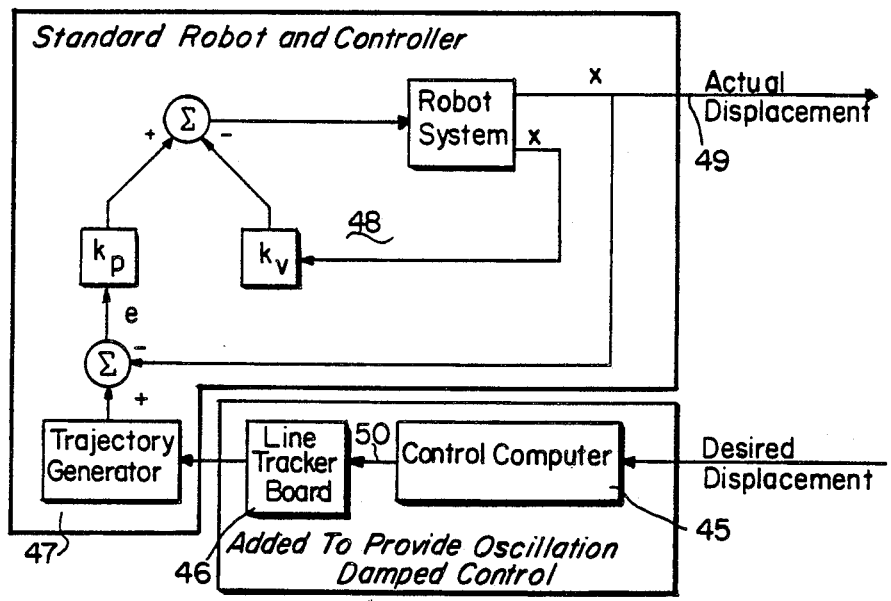
FIG. 8 is a diagram showing implementation of an oscillation damped control strategy on a CIMCORP XR® 6100 robot.

Referring now to FIG. 8, implementation of the invention is effected on a CIMCORP XR ® 6100 robot.

In operation, a desired displacement is entered into a control computer 45 which generates the required robot acceleration profile needed to develop an oscillation damped trajectory for a simply suspended object 22. The acceleration profile is then passed through a CIMCORP Line Tracker Board 46 in the form of robot position updates every approximately 47 milliseconds where it is then passed to a standard robot controller 47 which determines the robot trajectory required to achieve the new position and sends the results into a robot control servo loop 48 which generates an actual displacement over output line 49. The software in the control computer 45 provides both low-level interrupt driven communications and high-level trajectory computation.

Communication between the robot controller 47 and the control computer 45 is synchronized by the robot controller through the Line Tracker Board 46. The Line Tracker Board 46 sends a synchronizing pulse to the control computer 45 every 47 milliseconds. When the control computer 45 receives the synchronizing pulse, it interrupts the currently active trajectory computation routine and sends the most current position update over a serial communication line 50 to the Line Tracker Board. After sending the position update to the Line Tracker Board 46, the communication routine running on the control computer returns control back to the trajectory computation routine.

The trajectory computation routine calculates the required position updates to obtain an oscillation damped trajectory by essentially selecting a point on the surface 37 of FIG. 6 which satisfies the condition of desired displacement. After a desired displacement is entered into the trajectory computation routine, the routine assumes an acceleration time $t_a$ and a corresponding intermediate constant velocity time T, thereby selecting a particular contour line on the surface 37 shown in FIG. 6. The trajectory computation routine then generates a solution between acceleration magnitude a and maximum constant velocity time $T_m$ using equation (2) and the equation for total displacement of point O:

$$S = 4at_a^2 + 2at_aT + 2at_a T_m \quad (5)$$

where S = Total displacement for point O.

When all the parameters are determined the trajectory computation routine calculates the oscillation damped trajectory position updates based on the 47-millisecond update rate of the Line Tracker Board 46. To move the robot, the trajectory computation routine passes a position update to the communication routine. The communication routine blocks execution of the trajectory computation routine until it receives a synchronization pulse from the Line Tracker Board 46, thereby properly synchronizing the trajectory computation routine with the Line Tracker Board 46. When the communication routine senses the synchronization pulse, it transmits the next position update to the Line Tracker Board 46 and then returns control to the trajectory computation routine. This process continues until the desired trajectory is complete.

EXAMPLE

The above-described control strategy was tested by suspending a 50-pound weight with an 80-inch cable from an XR® 6100 robot gripper. The small angle period of the pendulum was measured to be 2.87 seconds.

Table I illustrates the results of the sample test. During the test, the acceleration of the pivot point of the robot gripper remained constant for all trials at 12 inches per second squared in a horizontal direction. Likewise, the total robot displacement was held constant at 100 inches.

TABLE I

| | Results for Implemented System | | | |
|---|---|---|---|---|
| $t_a$ (sec) | T (sec) | $T_m$ (sec) | $V_{max}$ (in/sec) | residual oscillation (deg) |
| 1.44 | 0.000* | 0.0336 | 34.4 | 0.1 |
| 1.15 | 0.287 | 1.05 | 27.6 | 0.3 |
| 0.861 | 0.574 | 2.54 | 20.7 | 0.3 |
| 0.574 | 0.841 | 5.25 | 13.8 | 0.1 |
| 0.287 | 1.15 | 12.8 | 6.89 | 0.1 |

*(closest real solution)

As is seen in Table I there are residual oscillations in the range of 0.1 degrees to 0.3 degrees. While these are relatively minor oscillations, in theory there should be no residual oscillation after the robot has come to rest. In practice, deviations from theory resulting in residual oscillations stem from a number of sources. Based on computer simulations of the control strategy, the largest source of error comes from the update rate of the digital control system. The update rate is approximately 47 milliseconds; therefore, if the desired acceleration profile is not precisely definable in 47-millisecond intervals, some residual oscillation will result. Another source of error comes from time delays due to the response of the mechanical subsystem. Any deviation in the implementation from the desired acceleration profile can result in a distorted acceleration profile and, hence, in residual oscillations. Moreover, the servo control loop 48 itself can induce error, since the servo loop requires a position error to output power to the servo motors on the manipulator 49. The manipulator's actual position is always a nonconstant distance behind the desired position which results in a distorted acceleration profile. Finally, any initial oscillation of the swinging object 22 will, in general, result in residual oscillation.

The results set forth in Table I are, however, encouraging and significant as was indicated by a comparison test run where the standard CIMROC® 2 robot controller (not shown) was used to control the acceleration profile of the robot gripper using a cubic spline trajectory in accordance with the teachings of the article by Albert J. Sturm, "Robotic Trajectory Control of Acceleration and Velocity Using Cubic Splines", 8th Applied Mechanisms Conference, St. Louis, Mo., Sept. 19-21, 1983. The maximum acceleration was set at 12 inches per second squared, and the maximum velocity was set at 15 inches per second. For a 100-inch move, the resulting residual oscillation was 8.7 degrees. Residual oscillation of 8.7 degrees is, of course, significantly greater than the residual oscillation damped trajectory shown in Table I which ranged between 0.1 and 0.3 degrees.

Cubic Soline Displacement Trajectory

An oscillation damped stop for a simply suspended payload, such as the payload 22 of FIGS. 1 and 2, can be accomplished using a cubic spline displacement trajectory. Utilizing a cubic spline approach offers some practical advantages over the use of a constant acceleration trajectory. By using the cubic spline approach, no additional computational hardware need be added to an existing CIMROC® 2 robot controller. Since the cubic spline displacement trajectory is the trajectory generated by the standard CIMROC® 2 robot controller, only the acceleration magnitude and time for the trajectory must be determined. (See the aforementioned article by Albert J. Sturm.) All additional calculations can then take place in the host computer of the CIMROC® 2 controller, thereby removing the need for an external control computer, such as the computer 45 used for the aforediscussed constant acceleration trajectory consideration.

Figure 9:
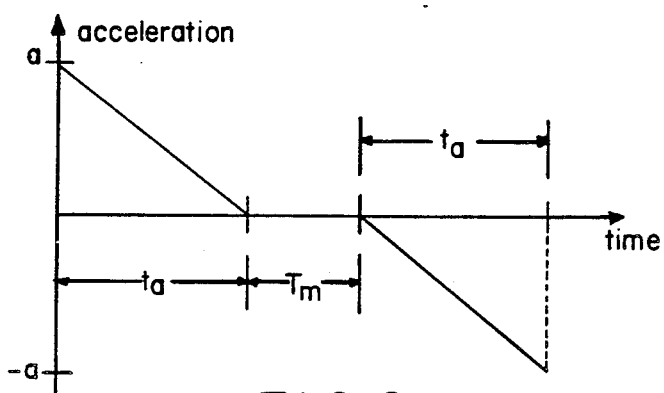
FIG. 9 is a diagram showing the acceleration curve for a cubic spline displacement trajectory which can result in an oscillation damped stop for a simply suspended object.

Utilizing the same transport system discussed with respect to FIG. 8, FIG 9 shows an acceleration curve for the cubic spline displacement trajectory which can result in an oscillation damped stop for a simply suspended object. Point O (see FIGS. 1 and 2) accelerates for a time $t_a$ following the curve shown in FIG. 9. Point O then travels at a constant velocity for a time $T_m$. During the duration of the constant velocity, the object 22 naturally oscillates. At the time $(t_a + T_m)$, point O begins to decelerate following the curve shown in FIG. 9. If time $T_m$ is selected properly, the simply suspended object's oscillation will be completely damped when point O comes to rest. Thus, the object is to determine the value of $T_m$ (parameterized with respect to $t_a$) which yields an oscillation damped stop.

The motion of the swinging object can then be described using the following differential equation:

$$\ddot{\theta} + \omega_o^2 \theta = 0 \qquad (6)$$

Equation (6) is a second-order linear differential equation with constant coefficients. Notice the use of a linear approximation for this approach. A linear approximation will be sufficiently accurate in this approach because the XR® 6100 robot that will be used for implementation is not capable of high enough accelerations to warrant the use of a nonlinear approximation.

Figure 10:
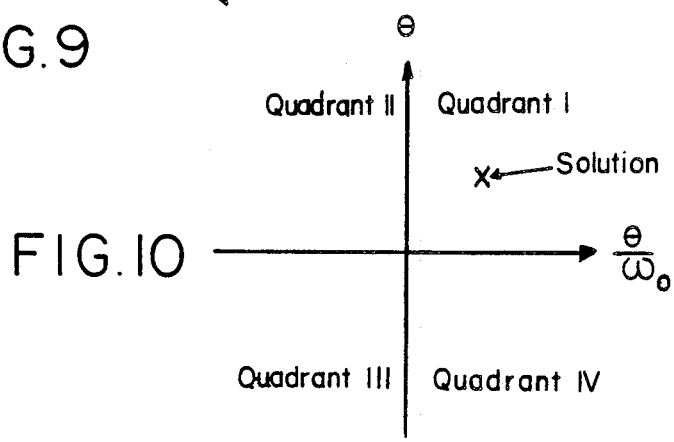
FIG. 10 is a graph demonstrating that the solution to the cubic spline displacement curve may reside in Quadrant I.

Using the cubic spline displacement curve adds one additional degree of complexity over using a constant acceleration curve. As is seen in FIG. 10, with a constant acceleration curve the solution for an oscillation damped trajectory may always reside in Quadrant I. In other words, the acceleration time is no longer than one-half period of the swinging object. However, using the cubic spline, no guarantee with respect to the acceleration time can be made. The phase between the angular velocity and displacement can, in theory, take on any value. Consequently, using the acceleration profile shown in FIG. 9, two functions must be written to express constant velocity time $T_m$ as a function of acceleration time $t_a$:

If $\theta \cdot \dot{\theta} \leq 0$ $$T_m = \frac{\tau_o}{\pi} \tan^{-1}[-2\pi\theta/\tau_o\dot{\theta}] + n\tau_o \text{ for } n = 0, 1, 2, \ldots \qquad (7)$$

where
$n$ - number of oscillations of the object during transportation
$\theta$ - angular displacement of the object at time $t_a$
$\dot{\theta}$ - angular velocity of the object at time $t_a$ Or if $\theta \cdot \dot{\theta} \geq 0$ $$T_m = \frac{\tau_o}{\pi} \tan^{-1}[-2\pi\theta/\tau_o\dot{\theta}] + (1+n)\tau_o \text{ for } n = 0, 1, 2, \ldots \qquad (8)$$

Equations (7) and (8) express all possible solutions for the constant velocity time $T_m$. Equation (7) is valid for Quadrants II and IV, while equation (8) is valid for Quadrants I and III, see FIG. 10. The integer variable n accounts for the number of complete oscillations made during transport.

The angular displacement and velocity expressed in terms of determinable system parameters is written as the operand for the arctangent function as follows:

$$[-2\pi\theta/\tau_o\dot{\theta}] = \frac{2\pi t_a \cos(2\pi t_a/\tau_o) - \tau_o \sin(2\pi t_a/\tau_o)}{\tau_o \cos(2\pi t_a/\tau_o) + 2\pi t_a \sin(2\pi t_a/\tau_o) - \tau_o} \qquad (9)$$

Equation (9) can be used to calculate the operand for the arctangent function and, depending upon the sign of the result, the operand can be substituted into equation (7) or equation (8) to obtain the duration of constant velocity time as a function of acceleration time and other determinable system parameters for an oscillation damped stop.

The oscillation damped stop strategy is implemented using a standard CIMCORP XR® 6100 robot arm and a CIMROC® 2 robot controller which requires no additional hardware to be added to a commercially available CIMROC® 2 controller or XR® 6100 robot arm. Utilizing the host computer within the standard CIMROC® 2 controller, only additional computations are required to implement an oscillation damped stop strategy.

The computations utilized in determining the acceleration magnitude and maximum velocity for a given displacement of the robot to obtain an oscillation damped stop are determined utilizing the required parameters for the cubic spline trajectory, the object's period and the desired displacement which is passed to a routine residing in the CIMROC® 2 host computer. The routine assumes an acceleration magnitude a, then iterates a solution between acceleration time $t_a$ and constant velocity time $T_m$ for an oscillation damped stop with the desired displacement using equation (7) or equation (8) substituting the values of equation (9) along with the equation for total displacement of point O, which results in a displacement:

$$S = \frac{2}{3} a t_a^2 + \frac{1}{2} a t_a T_m \qquad (10)$$

where S=Total displacement of point O.

Once the acceleration and constant velocity times are determined, the maximum velocity is calculated using:

$$V_{max} = \frac{1}{2} a t_a \qquad (11)$$

Finally, the robot's absolute maximum acceleration is set to a, it's absolute maximum velocity is set to $V_{max}$, and then the robot is commanded to move the desired displacement in accordance with the flow chart 8.

EXAMPLE

The foregoing control strategy was tested using a 50-pound weight suspended by an 82-inch cable from the XR® 6100 robot gripper. The small angle period of the pendulum was measured to be 2.89 seconds. Table II shows the results of these tests with results in all quadrants.

TABLE II
Results for Cubic Spline Implementation Using CIMROC ® 2 Controller

| Quadrant | $t_a$ (sec) | n | a (in/sec²) | $V_{max}$ (in/sec) | S (in) | residual oscillation (deg) |
|---|---|---|---|---|---|---|
| I | 0.4 | 0 | 48.0 | 9.6 | 26.8050 | 0.1* |
| I | 0.4 | 1 | 48.0 | 9.6 | 53.6178 | 0.1* |
| II | 1.5 | 0 | 20.0 | 15.0 | 41.1648 | 0.3 |
| II | 1.5 | 1 | 20.0 | 15.0 | 83.0598 | 0.4 |
| III | 2.5 | 0 | 10.0 | 12.5 | 66.0748 | 1.0 |
| III | 2.5 | 1 | 10.0 | 12.5 | 100.9873 | 1.3 |
| IV | 3.3 | 0 | 10.0 | 16.5 | 77.6023 | 0.3 |
| IV | 3.3 | 1 | 10.0 | 16.5 | 123.6868 | 2.0 |

*(less than result shown)

With the exception of the solutions in Quadrant I, the results show excessive residual oscillation. The residual oscillation is greater than can be explained with system nonidealities. Therefore, there are two possible explanations for the excessive residual oscillation obtained with solutions in Quadrants II, III and IV. Either the theory developed for oscillation damped stops only applies to Quadrant I, or the CIMROC ® 2 robot controller does not create the expected trajectory when the solution lies out of Quadrant I.

In order to determine which hypothesis is correct, greater control of the robot's trajectory was provided by utilizing an external control computer to generate the cubic spline displacement trajectory which, in effect, eliminates the CIMROC ® 2 trajectory generation. Table III shows the results for the same attempted trajectories as Table II, except the trajectory was generated by the external control computer.

TABLE III
Results for Cubic Spline Implementation Using External Control Computer

| Quadrant | $t_a$ (sec) | n | a (in/sec²) | $V_{max}$ (in/sec) | S (in) | residual oscillation (deg) |
|---|---|---|---|---|---|---|
| I | 0.4 | 0 | 48.0 | 9.6 | 26.8050 | 0.2 |
| I | 0.4 | 1 | 48.0 | 9.6 | 53.6178 | 0.1 |
| II | 1.5 | 0 | 20.0 | 15.0 | 41.1648 | 0.2 |
| II | 1.5 | 1 | 20.0 | 15.0 | 83.0598 | 0.3 |
| III | 2.5 | 0 | 10.0 | 12.5 | 66.0748 | 0.2 |
| III | 2.5 | 1 | 10.0 | 12.5 | 100.9873 | 0.2 |
| IV | 3.3 | 0 | 10.0 | 16.5 | 77.6023 | 0.2 |
| IV | 3.3 | 1 | 10.0 | 16.5 | 123.6868 | 0.2 |

As is seen in Table III, far superior results are obtained using the external control computer. Accordingly, the CIMROC ® 2 controller must not generate the expected trajectory when the solution lies outside of Quadrant I (FIG. 10). In order to implement the cubic spline displacement trajectory for oscillation damped stops on the CIMROC ® 2 controller, the solution must always be forced to lie in Quadrant I. By forcing the solution to lie in Quadrant I the problem with the CIMROC ® 2 controller not generating the expected trajectory can be avoided, and acceptable results can be obtained repeatedly, as seen in the residual oscillation degrees set forth in Table III.

The cubic spline trajectory is just one special case of a non-uniform acceleration profile. One can readily see, using arguments of symmetry, that any acceleration profile can be used to generate a swing damped motion in the following manner. If a(t) is the acceleration at time t, $0 \leq t \leq t_a$ and $\theta(t)$ is the displacement from the vertical of the suspended mass at time t, then if we select a time $t_n$ such that $\theta(t_a) = -\theta(t_n - t_a)$, and follow an acceleration profile $a(t') = -a(t_n - t')$ for $t_n - t_a \leq t' \leq t_n$, it is clear that at time $t_n$, the supported mass and the point of support will both be motionless. As the analysis of, and experimentation with the cubic spline case show, when the maximum acceleration is small, we can use a small angle approximation to the period of the pendulum, and this gives us the value of $T_a$. The value of $t_n$ is found from the desired distance of travel using the formula $$\text{Total distance} = 2 \int_o^{t_a} \int_o^{t_a} a(t)dt + (t_n - 2t_a) \int_o^{t_a} a(t)dt$$

Equations 7, 8 and 9 can be used to confirm whether the points $t_a$ and $t_n - t_a$ satisfy the constraint on $\theta(t)$.

For complex acceleration strategies with large accelerations, numerical methods can be used to solve the constrained equations presented.

Force Servo Damping

As is evident from the results of the oscillation damped trajectory using a constant acceleration profile and the oscillation damped stop using the cubic spline displacement trajectory, an oscillation damped trajectory or stop with zero residual oscillation requires additional procedures. In accordance with the instant invention, a force control system is used to damp residual oscillations of simply suspended payloads by servoing off the dynamic forces created by the swinging payload.

Figure 11A:
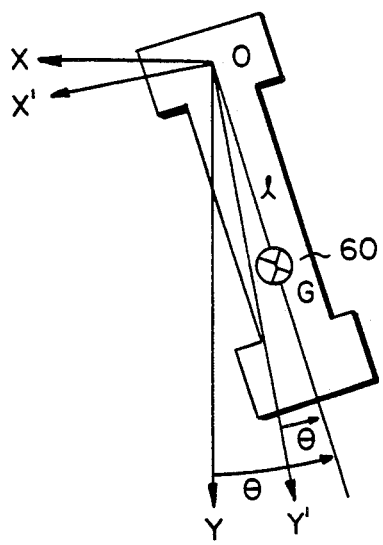
FIGS. 11A and 11B are free body diagrams of a simply supported object undergoing force servo damping in accordance with the principles of the instant invention.
Figure 11B:
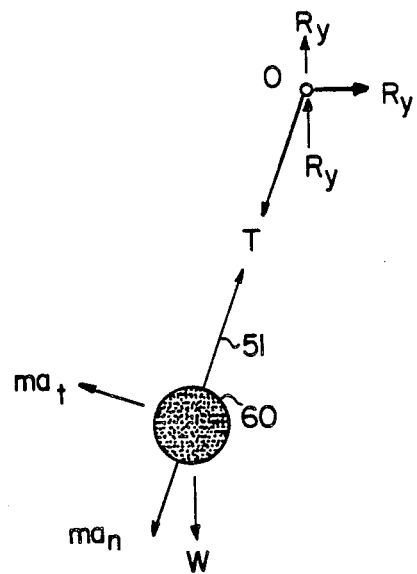

Referring now to FIGS. 11A and 11B, there is shown a free body diagram of a simply supported object 60 undergoing a force servo damping strategy. The motion of the object 60 relative to point O causes a force to be transmitted along the supporting member 51 to point O. By moving point O in the direction of the horizontal component or in a direction normal to gravity of the transmitted force T, there is a tendency to reduce the amplitude of oscillation of the swinging object 60. By continually following the transmitted force by an amount proportional to the magnitude of the transmitted force, the oscillation of the object 60 will eventually be damped out.

By continually following the transmitted force to damp the object's oscillation, the object 60 can be caused to drift away from a desired position. Forcing the object to end up at a desired location may be accomplished by using a "programmable magnet". The programmable magnet can be implemented by continually moving toward the desired location an amount that is proportional to the distance that point O is away from the desired location. If the proportionality constants for the programmable magnet and the force following strategy are selected properly, the sum of the movement of the programmable magnet and the movement of the force following strategy will cause the object's oscillation to be damped and cause the object 60 to end up at the desired location. This approach is not restricted to damping oscillation at any single plane of oscillation. Consequently, even if the object is swinging in two dimensions, this force servo damping strategy will effectively damp the oscillation.

EXAMPLE

Figure 12:
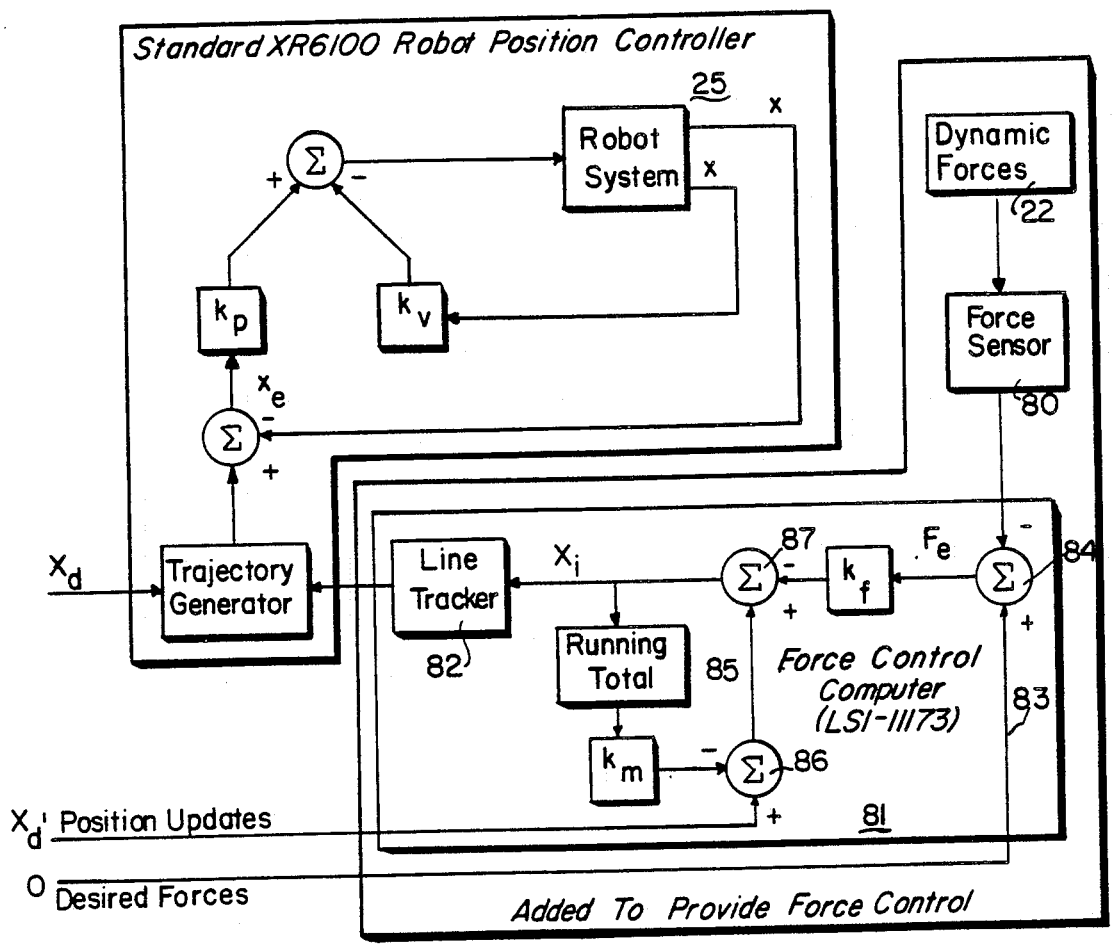
FIG. 12 is a circuit diagram illustrating implementation of the force damping algorithm in accordance with the instant invention.

The force control system is implemented on a standard CIMCORP XR ® 6100 robot (see FIG. 1). The XR ® 6100 system comprises a 2045 kg (4500 lb) gantry manipulator (see 24, FIG. 1) and a digital six-axis robot controller (see 25, FIG. 1). Referring now to FIG. 12, the hardware implementation requires three additional components to be added to the standard robot system, i.e., a force sensor 80, a control computer 81 and a CIMCORP Line Tracker Board 82 to allow high-speed communication with the robot controller 25.

The force sensor 80 is a conventional commercially available JR3 force/torque sensor capable of transducing the three principal forces and corresponding moments. The conventional JR3 has a conventional microprocessor which converts force and torque signals to digital readings and then transmits the digital readings to the control computer 81.

The control computer 81 is a commercially available Digital Equipment Corporation LSI-11/73 ® executing the RT-11 ® real-time operating system. The control computer 81, which executes the oscillation damping algorithm, continually monitors the force sensor 80, computes required position updates, and communicates these updates to the Line Tracker Board 82. The Line Tracker Board 82 provides the interrupt driven communication for the trajectory updates from the control computer 81 to the robot controller 25.

As is seen in FIG. 12, the force sensor 80 detects the forces created by the swinging object 22. The sensed forces are subtracted from the desired force 83 which may be "zero" in a summer 84, and the results $F_e$ are multiplied by force following gain $K_F$ to obtain the force following component of the robot movement. In addition, the total movement stored in totalizer 85 of the robot 25 is subtracted from the desired displacement updates Xd' in summer 86 and the results multiplied by a "programmable magnet" gain $K_m$ to obtain the programmable magnet component of the robot movement. The resulting values for the force following strategy and the programmable magnet are summed by summer 87 and the result sent to the standard robot controller 25. The gains are determined empirically to provide a responsive yet stable damping force.

In addition to the force damping algorithm, the control computer 81 performs the interrupt driven communications between the control computer and the force sensor 80, as the force sensor communicates data serially to the control computer. Once the control computer 81 receives a complete data set, the data is stored for use by the force control algorithm.

The control computer 81 also performs the interrupt driven communications between the control computer and the robot controller. The communication from the control computer 81 to the robot controller 25 is through the line tracker 82 which sends a signal to the force control computer 81 every 47 milliseconds. When the control computer 81 receives the signal, it initiates the force control computation using the most recent force data, computes the approximate robot position update using the force damping algorithm and communicates this information to the line tracker 82. After the position update is sent to the line tracker 82, the force control routine waits for the next signal from the line tracker 82.

EXAMPLE

The force servo control strategy was tested by suspending a 50-pound weight with an 82-inch cable from an XR ® 6100 robot gripper. The small angle period of pendulum was measured to be 2.89 seconds. The pendulum was displaced three degrees and allowed to swing freely, thereby allowing the oscillation to decay naturally. The pendulum was then displaced three degrees and the force servo damping initiated.

Without the force servo control strategy, the pendulum still had an amplitude of one degree, even after it had been swinging for 30 minutes. Calculations from test results show that the test pendulum would take on the order of one and one-half hours for the amplitude of the object to decay to 0.1 degrees.

Utilizing the force servo control strategy, the pendulum oscillation typically was damped to less than 0.1 degrees oscillation in 50 seconds, with a force following gain of 0.025 inches per pound. The desired position error was on the order of 0.05 inches with a programmable magnet gain of 10 percent of the total position error.

From the foregoing description, one skilled in the art can easily ascertain the essential characteristics of this invention, and without departing from the spirit and scope thereof, can make various changes and modifications of the invention to adapt it to various usages and conditions.

The entire texts of all applications, patents and publications, if any, cited above and below, are hereby incorporated by reference.

What is claimed is:

1. A method of swing damping the movement of an object suspended from a horizontally moveable trolley, wherein the trolley moves the object from a first position to a second position, the method comprising the steps of:
    accelerating the trolley with a desired acceleration profile to achieve a desired transport velocity;
    maintaining motion at a constant velocity, the time of constant velocity transit being determined by the period of the suspended mass and satisfying the equation $\theta(t_a) = -\theta(t_n - t_a)$, where $\theta(t)$ is the amplitude of the suspended mass at time t, $t_a$ is the length of time to complete the acceleration profile, and $t_n$ is total transit time;
    decelerating the trolley to bring the trolley to rest with the suspended mass at rest below the trolley, the deceleration profile being symmetric to the desired acceleration profile and satisfying the equation $a(t) = a(t_n - t)$, where a(t) is the acceleration at time t, $a(t_n - t)$ is the declaration at time $t_n - t$, and $t_n$ is the total transit time.

2. The method of claim 1, wherein the acceleration profile is a constant acceleration for a time $t_a$, a total transit time being $t_n$, with an angle of swing being $\theta(t_a) = -\theta(t_n - t_a)$.

3. The method of claim 1, in which the acceleration profile is comprised of three parts;
    a period of constant acceleration at rate a;
    a period of constant acceleration at rate 0;
    a period of constant acceleration at rate a;
where the length of these periods is selected to provide for swing damped motion at the end of the completed acceleration phase, the periods of acceleration at rate a being of equal length $t_a$, and the period of acceleration at rate 0 having length T, where the relationship between $t_a$ and T is determined by the period of the suspended mass as shown in the following equation:

$$T = \frac{\tau T}{\pi} \tan^{-1}\left[\frac{\tau T}{\tau_{ta}\tan(\pi t_a / \tau_{ta})}\right] \qquad (3)$$

where
- $\tau_T$—the period of the swinging object, accounting for all nonlinearities during the time of intermediate constant velocity,
- $T_{ta}$—the period of the swinging object, accounting for all nonlinearities during the time of constant acceleration, the resulting acceleration profile being a transit consisting of an initial acceleration phase, a period in which the suspended mass is at rest relative to the moving trolley, and finally a deceleration phase which terminates with the suspended mass at rest beneath the stopped trolley.

4. The method of claim 1, in which the acceleration profile is a cubic spline function in which there is a period of acceleration, a period of constant velocity, and a period of deceleration; the acceleration having a maximum rate a at time 0, and decreasing linearly to zero at time $t_a$, the deceleration profile being symmetric to the acceleration profile; and the value of $t_a$ and the value of T, the duration of motion at constant velocity, being determined from the following equation: if $$\theta \cdot \dot{\theta} \leq 0,$$

$$T_m = \frac{\tau_o}{\pi} \tan^{-1}\{-2\pi\theta/\tau_o\dot{\theta}\} + n\tau_o, \text{ for } n = 0, 1, 2, \ldots$$

where
- n = number of oscillations of the object during transportation,
- $\theta$ = angular displacement of the object at time $t_a$,
- $\dot{\theta}$ = angular velocity of the object at time $t_a$, this resulting acceleration profile being a transit consisting of an initial acceleration phase, a period of constant velocity for a time $T_m$, in which the suspended mass oscillates relative to the moving trolley, and finally a deceleration phase which terminates with the suspended mass at rest beneath the stopped trolley.

5. An apparatus for damping initial or residual swing of a load suspended by a flexible cable from a horizontally moving trolley controlled by a controller in which forces exerted on the trolley by the motion of the suspended load are used to provide a position error signal, the apparatus comprising:
- means for sensing forces on point of suspension of the load and providing an output indicative of the sensed forces;
- means for subtracting the sensed forces from desired forces to generate a force error;
- means for multiplying the force-error by a damping factor to create a force-position error;
- means for maintaining the accumulation deviations of position from a desired position;
- means for multiplying the accumulation deviation of position by a damping factor;
- means for summing the force-position error with the damped accumulated position error; and
- means for transmitting the summed-damped errors to the controller of the trolley.

6. The apparatus of claim 5 in which the additions and multiplications are performed using analog signals.

7. The apparatus of claim 5 in which the additions and multiplications are performed using digital signals.

8. The apparatus of claim 5 in which a combination of digital and analog signals are used to carry out the additions and multiplications.

9. A method of swing damping the movement of an object suspended from a horizontally movable trolley, wherein the trolley moves the object from a first position to a second position, the method comprising the steps of:
- accelerating the trolley with non-uniform acceleration until the trolley reaches preplanned velocity and then decelerating the trolley at a non-uniform deceleration until the trolley stops at the second position;
- damping the motion of the load if the load is not initially at rest by sensing forces exerted by the load on the hoist with a force sensor;
- summing the output of the force sensor with a desired force and multiplying the result by force following gains to obtain a force following component of robot movement; and
- summing the programmable component of robot movement with position updates and passing the result through a line tracker which updates the input from the force sensor while providing output from the force control computer to a trajectory generator, the output of which operates the robot position controller according to a selected acceleration profile which includes empirical inputs from the force sensor.

10. The method of claim 9, wherein the acceleration times are calculated by solving the equation:
if $$\theta \cdot \dot{\theta} \leq 0$$

$$T_m = \frac{\tau_o}{\pi} \tan^{-1}[-2\pi\theta/\tau_o\dot{\theta}] + n\tau_o \text{ for } n = 0, 1, 2, \ldots$$

where
- n—number of oscillations of the object during transportation
- $\theta$—angular displacement of the object at time $t_a$
- $\dot{\theta}$—angular velocity of the object at time $t_a$ or if;

$$\theta \cdot \dot{\theta} \geq 0$$

$$T_m = \frac{\tau_o}{\pi} \tan^{-1}[-2\pi\theta/\tau_o\dot{\theta}] + (1 + n)\tau_o \text{ for } n = 0, 1, 2, \ldots$$

11. A method of swing damping movement of a load suspended from a gantry which translates in a horizontal direction, wherein the gantry is controlled by a robot position controller which sums the actual position of the gantry with the desired position of the gantry to produce a position error signal, which position error signal is summed with a negative velocity until the output is zero which causes the gantry to stop, the method comprising:
- sensing dynamic forces on the load due to initial swinging of the load and providing an output indicative of the sensed forces;
- subtracting the output from the force sensor from a desired force of input to generate a force error expressed as a force position error;
- subtracting the force position error from an actual position update input from which a running total of position increments has been subtracted to produce the position increments;

feeding the position increment signals through a line tracker, which line tracker periodically updates the aforerecited steps, and applying the output of the line tracker to trajectory generator in the robot position controller which trajectory generator subtracts the line tracker signal from a desired position signal so as to provide a position error signal which includes a component indicative of the sensed dynamic forces.

12. The method of claim 11, wherein the line tracker updates the procedure about every 47 milliseconds to adjust for changes in the position of the load.

13. A system for swing damping movement of a load suspended from a gantry which translates in horizontal directions, wherein the gantry is controlled by a robot position controller which sums the actual position of the gantry with the desired position of the qantry to produce a position error signal, which position error signal is modified by the output of a trajectory generator which has as an input a desired position signal, the position error signal being summed with a negative velocity signal until the output is zero which causes the gantry to stop, the system comprising:

force sensing means for sensing dynamic forces on the load due to initial swinging of the load and providing an output indicative of the sensed forces;

means for subtracting the output from the force sensing means from a desired input force to generate a force error expressed as a force position error;

means for feeding an actual position signal to a position update summer;

means for totalizing a running total of position increments;

means for subtracting the force position error from an actual position update input from which the running total of position increments has been subtracted to produce the position increment signals;

a line tracker for periodically updating the position of the load;

means for feeding the position increment signals through the line tracker, and means for applying the output of the line tracker to the trajectory generator in the robot position controller which trajectory generator subtracts the line tracker signal from a desired position signal so as to provide a position error signal which includes a component indicative of the sensed dynamic forces.

14. The system of claim 13, wherein the line tracker includes means for updating the procedure about every 47 milliseconds to adjust for changes in the position of the load.

* * * * *